(12) United States Patent
Pelage

(10) Patent No.: US 11,936,631 B2
(45) Date of Patent: Mar. 19, 2024

(54) METHOD AND SYSTEM FOR COMPUTER-ASSISTED MAINTENANCE

(71) Applicant: VIACCESS, Courbevoie (FR)

(72) Inventor: Pérez Pelage, Medan (FR)

(73) Assignee: VIACCESS, Courbevoie (FR)

( * ) Notice: Subject to any disclaimer, the term of this patent is extended or adjusted under 35 U.S.C. 154(b) by 234 days.

(21) Appl. No.: 17/309,876

(22) PCT Filed: Dec. 27, 2019

(86) PCT No.: PCT/EP2019/087108
§ 371 (c)(1),
(2) Date: Jun. 25, 2021

(87) PCT Pub. No.: WO2020/136266
PCT Pub. Date: Jul. 2, 2020

(65) Prior Publication Data
US 2022/0094670 A1    Mar. 24, 2022

(30) Foreign Application Priority Data
Dec. 28, 2018   (FR) ...................................... 18 74304

(51) Int. Cl.
*H04L 9/40* (2022.01)
*H04L 9/00* (2022.01)
(Continued)

(52) U.S. Cl.
CPC .......... *H04L 63/0428* (2013.01); *H04L 9/008* (2013.01); *H04L 9/0894* (2013.01); *H04L 9/3073* (2013.01); *G06F 30/10* (2020.01)

(58) Field of Classification Search
None
See application file for complete search history.

(56) References Cited

U.S. PATENT DOCUMENTS

| 2011/0191407 A1* | 8/2011 | Fu ............................. G06F 8/38 709/203 |
| 2018/0340411 A1* | 11/2018 | Munda .................. E21B 47/008 |
| 2020/0244435 A1* | 7/2020 | Shpurov ................. G06F 21/64 |

FOREIGN PATENT DOCUMENTS

WO    2018/052444 A1    3/2018

OTHER PUBLICATIONS

French Search Report for French Patent Application No. FR 1874304, dated Nov. 13, 2019 in 2 pages.
(Continued)

*Primary Examiner* — Brandon Hoffman
(74) *Attorney, Agent, or Firm* — Knobbe, Martens, Olson & Bear, LLP

(57) ABSTRACT

The invention relates to a method and a system for computer-assisted maintenance of a device to be maintained, comprising a storage in a first system, which storage is implemented progressively when in use an operating system comprising the device to be maintained, of operational data associated with the said operating system. For a maintenance processing method, which is to be implemented by the second system (8) by applying a processing algorithm (38) to a set of operational data, the maintenance system uses a homomorphic or partially homomorphic cryptosystem (28) to obtain a modified maintenance processing algorithm (40) which makes it possible to obtain an item of predictive or corrective maintenance information in encrypted form, from a set of protected operational data comprising a first subset of encrypted operational data $((D1)_H)$ by a means of a cryptosystem encryption method (28), and a second subset of plain data ($D_2$) from the said set of operational data.

12 Claims, 3 Drawing Sheets

(51) Int. Cl.
*H04L 9/08* (2006.01)
*H04L 9/30* (2006.01)
*G06F 30/10* (2020.01)

(56) References Cited

OTHER PUBLICATIONS

International Search Report for International Patent Application No. PCT/EP2019/087108, dated Feb. 24, 2020 in 6 pages.
Wu et al., "Cybersecurity for digital manufacturing"; Journal of Manufacturing Systems, Society of Manufacturing Engineers, Dearborn, MI, US, vol. 48, Apr. 4, 2018 pp. 3-12.

* cited by examiner

METHOD AND SYSTEM FOR COMPUTER-ASSISTED MAINTENANCE

CROSS-REFERENCE TO RELATED APPLICATIONS

This application is the U.S. National Phase under 35. U.S.C. § 371 of International Application PCT/EP2019/087108, filed Dec. 27, 2019, which claims priority to French Patent Application No. 1874304, filed Dec. 28, 2018. The disclosures of the above-described applications are hereby incorporated by reference in their entirety.

FIELD OF THE INVENTION

The present invention relates to a method and system for computer-assisted maintenance of a device to be maintained.

The invention is in the field of computer-assisted manufacturing, and in particular the manufacture of parts from three-dimensional models obtained by computer-assisted design.

BACKGROUND OF THE INVENTION

In the field of computer-assisted manufacturing there is, on the one hand, additive manufacturing, for example 3D printing, in which a part is manufactured by depositing successive layers of one or more predetermined materials, and on the other hand, subtractive manufacturing, in which a 3D part is manufactured by removing material from a block of material.

In addition, computer-assisted manufacturing encompasses the physical manufacturing of physical objects and so-called virtual manufacturing, in which a digital twin of a physical object is generated. The digital twin of a physical object is a digital object, simulating the physical object in a computer system, with the same shape and the same physical properties, and is used for example to test performance and robustness properties of the object before its actual physical manufacture, or to perform predictive maintenance of the manufactured or to-be-manufactured part itself, or of its manufacturing machine. Thus, during the use of the physical part after it has been manufactured, its digital twin is enriched along the way with operational data from the physical part. This operational data is received from the part itself or from its operating environment, which obtains it from sensors it is equipped with for this purpose.

Virtual manufacturing is advantageous in particular in phases of industrial prototyping, where it makes it possible to reduce the manufacturing costs by avoiding the manufacture of multiple expensive prototypes. It is also advantageous for predictive maintenance purposes, wherein it allows to anticipate the occurrence of defects or failures, and thus the need for maintenance interventions of a device to be maintained which is the manufactured part or a manufacturing device. It also allows to test and validate the content of these interventions in terms of actions or operating commands, or other instructions, for example.

Computer-assisted manufacturing requires the development of many parameters, including physical parameters of the materials used for manufacturing, operating parameters of the manufacturing machines, parameters of the manufacturing environment (pressure, temperature), ranges of acceptable values for the various parameters, default values of these parameters.

All these parameters are called operational parameters. The values of the operational parameters, called operational data, are memorized progressively during the operation, in particular for predictive or corrective maintenance operations.

Some operational data are considered as confidential by an operator of a system in operation because they contain industrial know-how.

Maintenance operations are performed by a specialized third party, which may, in practice, be different from the operator of the system in operation.

It is therefore desirable to provide a computer-assisted maintenance system that allows the operational data of this operator to be protected.

SUMMARY OF THE INVENTION

To this end, the invention proposes a computer-assisted maintenance method for a device to be maintained, comprising a storage in a first system which is implemented progressively during the use of an operating system including the device to be maintained, operational data associated with the said system in operation, comprising the implementation of a maintenance process in a second system, the said first and second systems being adapted to communicate with each other according to a communication protocol. This method comprises, for a maintenance processing identified by a maintenance processing identifier to be implemented by the second system by applying a maintenance processing algorithm to a set of operational data to obtain at least one predictive or corrective maintenance information of the said device to be maintained, steps consisting of:
  obtaining a modified maintenance processing algorithm computed by a homomorphic or partially homomorphic cryptosystem, to enable the said at least one predictive or corrective maintenance information to be obtained, without implementing a cryptographic operation, in encrypted form, from a protected operational data set comprising a first subset of data of the said operational data set encrypted by a homomorphic or partially homomorphic cryptosystem encryption method, and a second subset of plain data of said operational data set
  implementing the said modified maintenance processing algorithm on the second system from a first subset of encrypted operational data and a second subset of plain operational data obtained from the first system.

Advantageously, the computer-assisted maintenance processing method according to the invention makes it possible to maintain knowledge of all the operational data in a first system, known as the operational data protection system, implemented by a first actor, for example the operator of the device to be maintained, and to provide part of the operational data, considered confidential, in the form of a first subset of encrypted data to a second system, known as the maintenance system, implemented by a third party known as the maintenance actor. Advantageously, the maintenance actor does not have access to the confidential operational data but can nevertheless perform maintenance processing.

The maintenance method according to the invention may have one or more of the features below, taken independently or according to any acceptable combination.

The method further comprises, following implementation of the modified maintenance processing algorithm, transmission of the said at least one predictive or corrective maintenance information in encrypted form to the first system.

The implementation of the modified maintenance processing algorithm, comprises the following steps implemented by the second system:

receiving a maintenance request from a device to be maintained.

obtaining a maintenance processing identifier to be implemented, formulating a request to obtain operational data from the operating system for the maintenance of the device to be maintained according to the identified maintenance processing method, and sending the said request to the first system, the said request including at least one identifier of the maintenance processing method to be applied.

The implementation of the modified maintenance processing algorithm comprises the following steps, implemented by the first system:

receiving a request to obtain operational data identifying a maintenance processing method from the second system, obtaining the set of operational data relating to the operating system useful for carrying out the identified maintenance processing method, separating the said set of operational data into a first subset of confidential data and a second sub-set of non-confidential data, encryption, by means of the encryption module of the homomorphic or partially homomorphic cryptosystem, of the data of the first subset of data, transmitting the first subset of encrypted data and the second subset of clear data to the second system.

The method comprises a prior step of obtaining and storing a cryptographic key pair by the said first system, to be used by the said cryptosystem to perform encryption and decryption.

Obtaining a modified maintenance processing algorithm, implemented by the said first system, comprises:

a partitioning of the operational data set associated with the identified maintenance processing into a first subset of confidential data and a second subset of non-confidential data, computing the modified maintenance processing algorithm from the maintenance processing algorithm depending on the partition of the operational data and at least one key of the cryptographic key pair.

Each of the first and second data subsets has an associated cardinal, and the method includes, following a computational optimization request from the second system, an iteration by the first system of the partitioning and computation steps of the modified maintenance processing algorithm, comprising during the partitioning step a reduction in the cardinal of the first data subset.

The method further comprises a transmission of the modified maintenance processing algorithm from the first system to the second system.

The first system is configured to maintain and store a digital twin of the device to be maintained.

According to another aspect, the invention relates to a system for computer-assisted maintenance of a device to be maintained, comprising a first system adapted to store progressively when in use, an operating system comprising the device to be maintained, operational data associated with said operating system, and a second system adapted to implement maintenance processing, the said first and second systems being adapted to communicate with each other according to a communication protocol. This system comprises, for a maintenance processing method identified by a maintenance processing identifier to be implemented by the second system by applying a maintenance processing algorithm to a set of operational data to obtain at least one predictive or corrective maintenance information of the said device to be maintained, of the modules configured to:

calculating by a homomorphic or partially homomorphic cryptosystem, a maintenance processing algorithm modified to allow obtaining, without implementing a cryptographic operation, the said at least one predictive or corrective maintenance information in encrypted form, from a protected operational data set comprising a first subset of data of the said operational data set encrypted by an encryption module of the homomorphic or partially homomorphic cryptosystem, and a second subset of data in plain text of the said operational data set, implementing the said modified maintenance processing algorithm on the second system from a first subset of encrypted operational data and a second subset of plain operational data obtained from the first system.

According to an advantageous feature, the first system comprises a module configured to perform:

a partitioning of the set of operational data associated with the identified maintenance processing method into a first subset of confidential data and a second subset of non-confidential data, a calculation of the modified maintenance processing algorithm from the maintenance processing algorithm, depending on the partition of the operational data and the cryptographic key pair.

According to an advantageous feature, the first system is configured to maintain and update a digital twin of the device to be maintained.

BRIEF DESCRIPTION OF THE DRAWINGS

Further features and advantages of the invention will be apparent from the description given below, by way of illustration and not in any way limiting, with reference to the appended figures, of which.

DETAILED DESCRIPTION OF THE PREFERRED EMBODIMENTS

Figure 1:
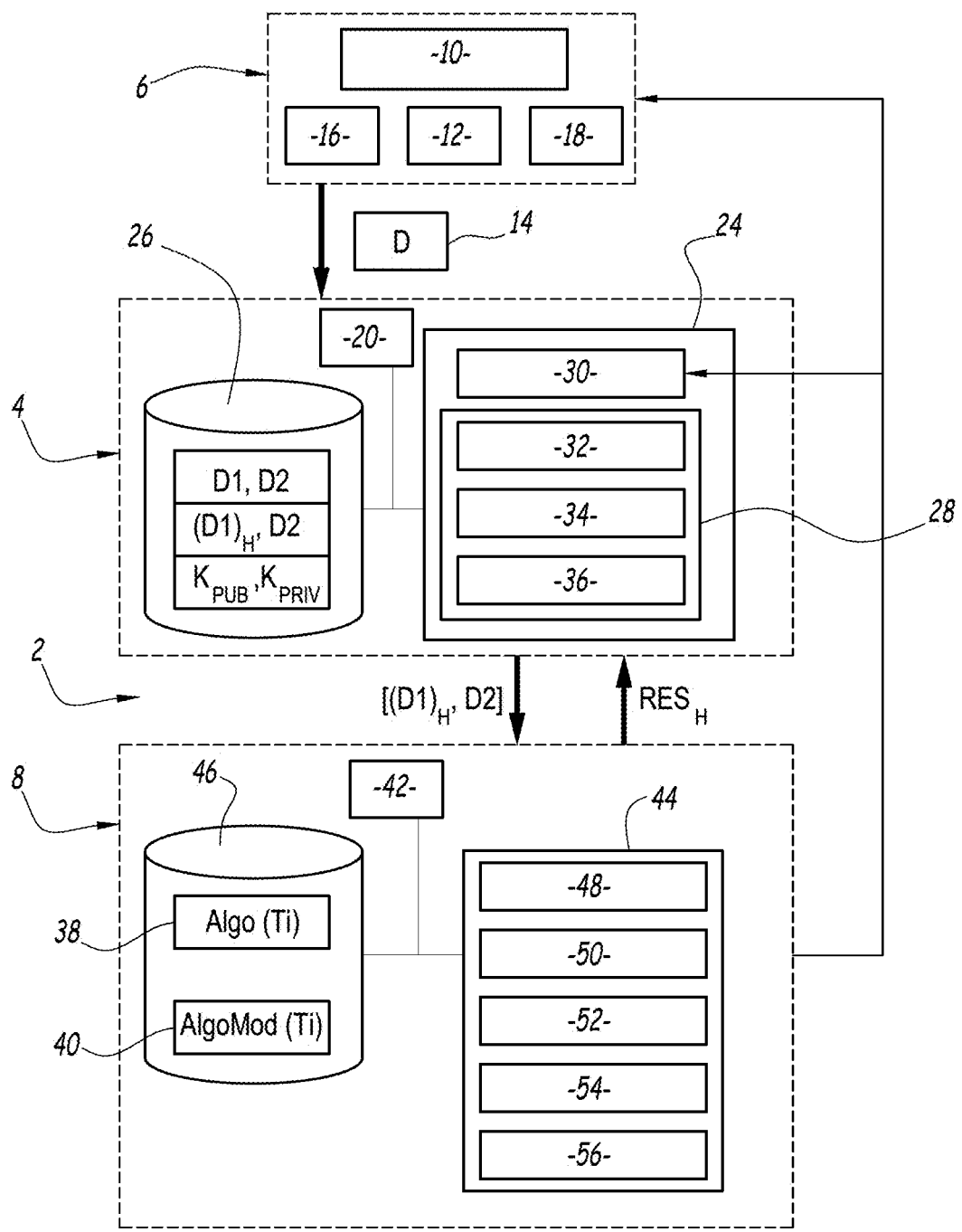
FIG. 1 schematically illustrates a system for implementing one embodiment of the invention.

FIG. 1 schematically illustrates a system for implementing an embodiment of the invention.

In this example, the system 2 comprises a first system 4, known as the operational data protection system, implemented by a first actor, for example an operator of an operational system 6, or a third party specialized for this purpose. It also comprises a second system 8, called maintenance system, which is implemented by a second actor, who performs maintenance processing, also called maintenance actor.

The system 6 is not shown in detail in the example of FIG. 1. For example, the system 6 is a system of known type, for example 3D printing.

A device 10, to be maintained, is included in the system 6 in operation. According to one embodiment, the device to be maintained is the system 6 itself.

According to a variant, the device 10 to be maintained is a subsystem, typically a part, of the system 6. The system 6 is then an operating environment of the device to be maintained.

In another example, the system 6 is a 3D printer and the device to be maintained is a part of the 3D printer. In another example, the system 6 is an aircraft or a wing of an aircraft, and the device 10 to be maintained is the aircraft itself, a wing of the aircraft, or a high lift flap of that wing, or, respectively, the wing itself or a high lift flap of that wing. Thus, operational data collected in the system 6 that constitutes an operating environment of the device to be maintained is useful for maintenance of the device to be maintained.

The system 6 comprises a communication module 12, allowing it to communicate with the first system 4 according to a predetermined communication protocol, for example a radio communication protocol. In particular, the communication module 12 is adapted to transmit operational data 14, relating to the system in operation, obtained during an operational process of the system 6 in operation, for example here a computer-assisted manufacturing process of three-dimensional parts, or a flight or a series of flights of an aircraft.

Operational parameters are predefined, for example temperature, pressure, operating diagnosis, ranges of good operating values. The operational data is associated with the operation of the system in operation.

The operational data is obtained by sensors 16 that are part of the system 6 in operation.

The operational data may be stored, in a memory 18 of the system 6, and at least a portion of this operational data 14 is transmitted, as it is obtained by the sensors 16, to the first system 4.

Alternatively, the transmission of the operational data 14 is triggered by the occurrence of predetermined events. In another variant, the operational data 14 is transmitted upon request.

At least one of the components of the system 6 from among the communication module 12, the sensors 16 and the memory 18 may be integrated into the device to be maintained 10. Alternatively, these components may be integrated in any viable combination with different hardware components of the system 6.

The first system 4 is a computer system, for example an electronic computing device such as a computer or an electronic device realized in the form of programmable logic components, such as an FPGA (Field-Programmable Gate Array), or in the form of dedicated integrated circuits, such as an ASIC (Application-Specific Integrated Circuit). Alternatively, the first system 4 consists of a plurality of such computer systems, into which the components 20 to 36 of the first system 4 are integrated in any viable combination.

In one embodiment, the first system 4 is remote from the operating system 6 and comprises a communication module 20 adapted to communicate with the operating system 6 and/or with the second system 8 according to a same communication protocol, or several distinct communication protocols. In a variant, not shown, the first system comprises several such distinct communication modules.

The first system 4 comprises a central processing unit 24, or CPU, comprising one or more electronic processors, capable of executing computer program instructions when the first system is powered on.

The first system 4 also comprises an electronic memory unit 26 adapted to store information, in particular registers. In particular, executable code instructions suitable for implementing the methods according to the invention are stored. The various functional blocks of the first system 4 are connected via a communication bus.

The central processing unit 24 is provided for implementing a homomorphic or partially homomorphic cryptosystem 28 as described in detail below.

In the embodiment illustrated in FIG. 1, the CPU 24, in collaboration with the electronic memory unit 26, is adapted to implement a digital twin 30 of the device to be maintained 10.

For example, the digital twin is described by mathematical models and algorithms, allowing to model the device to be maintained, the modeling being updated with the received operational data. Thus, the digital twin 30 is at all times representative of the device to be maintained 10.

In one embodiment, the cryptosystem 28 comprises a module 32 for calculating, for a given maintenance processing, a modified maintenance processing algorithm 40 from a maintenance processing algorithm 38.

Indeed, a maintenance processing method, noted Ti, is defined by a maintenance processing method algorithm on a set D of operational data. Such a processing allows to obtain at least a predictive or corrective maintenance information (noted RES) of the device to be maintained.

For example, the maintenance processing includes comparisons of operational data with predetermined thresholds of good functioning, and a maintenance information is any action or command for operating the device 10 to be maintained, for example an instruction to modify the value of an operational parameter following a finding that a predetermined threshold of good functioning has been exceeded. The maintenance information can also be an instruction to replace a part of the device 10 to be maintained, or to replace this device itself, or an alarm.

The module 32 is adapted to partition, for the maintenance processing method Ti, the set of operational data to be used by the maintenance processing algorithm 38, into a first subset D1 of operational data containing confidential operational data to be encrypted, and a second subset D2 of non-confidential operational data, usable in its initial format without encryption. The partition into data subsets (D1, D2) is stored in the electronic memory unit 26.

The cryptosystem 28 uses a cryptographic key pair, or bi-key, consisting of a public key $K_{pub}$ and a private key $K_{priv}$, associated with the digital twin 30.

For example, the TFHE (Fully Homomorphic Encryption over the Torus) cryptosystem is used. This cryptosystem is fully homomorphic, i.e. of constant multiplicative depth regardless of the algorithmic complexity. For this cryptosystem, the private key has a size of about 20 kb (kilobytes) and the public key has a size of about 150 kb. Such a system is advantageous in terms of computational efficiency.

The key pair ($K_{pub}$, $K_{priv}$) is used by the encryption module 34 to obtain from the first subset of operational data D1, a first subset of encrypted operational data, i.e., each encrypted with the public key $K_{pub}$, denoted $(D1)_H$. The confidentiality of the encrypted operational data is thus guaranteed, as it can only be decrypted using the private key $K_{priv}$, held by the first operational data protection system 4.

The module 32 computes a modified maintenance processing algorithm 40 which is such that, when applied to a data set formed of the first subset of encrypted operational data $(D1)_H$ and the second subset of unencrypted, or plain, operational data D2, provides the maintenance information in encrypted form (denoted $RES_H$).

For simplified explanation, the data set is denoted: $D = \{d_1, \ldots, d_N\}$ and the maintenance processing algorithm 38 applies a function f on the set D to obtain a result RES:

$$f(d_1, \ldots, d_N) = RES \quad \text{[Math 1]}$$

The data is partitioned into two subsets, each subset containing operational data. We respectively note the first subset D1, made of confidential operational data, and the second subset D2, made of non-confidential operational data: $D_1 = \{d_1, \ldots, d_Q\}$ of cardinal Q and $D_2 = \{d_{Q+1}, \ldots, d_N\}$ of cardinal N-Q.

The data in the first subset will be encrypted by an encryption function H to obtain a first set of encrypted data:

$$(D_1)_H = \{(d_1)_H, \ldots, (d_Q)_H\} \quad \text{[Math 2]}$$

The modified maintenance processing algorithm applies a function g such that:

$$g((d_1)_H, \ldots, (d_Q)_H, d_{Q+1}, \ldots, d_N) = (RES)_H \quad \text{[Math 3]}$$

The homomorphic or partially homomorphic cryptosystem 28 also comprises a decryption module 36, adapted to decrypt encrypted data using the key pair ($K_{pub}$, $K_{priv}$), used in particular to decrypt with the private key $K_{priv}$ the encrypted maintenance information $RES_H$ to obtain plain maintenance information, RES.

The second system 8 is a computer system, for example an electronic computing device such as a computer or an electronic device realized in the form of programmable logic components, such as an FPGA (Field-Programmable Gate Array), or in the form of dedicated integrated circuits, such as an ASIC (Application-Specific Integrated Circuit). Alternatively, the second system 8 consists of several such computer systems, into which the components 38 to 56 of the second system 8 are integrated according to any viable combination.

It comprises a communication module 42 adapted to communicate with the first system 4. The communication module 42 is adapted to communicate according to one communication protocol, or several distinct communication protocols. Alternatively, not shown, the second system comprises several such communication modules.

The second system 8 comprises a central processing unit 44, or CPU, comprising one or more electronic processors, adapted to execute computer program instructions when the second system is powered on.

The second system 8 also comprises an electronic memory unit 46 adapted to store information. In particular, executable code instructions suitable for implementing the processes according to the invention are stored. The various functional blocks of the second system 8 are connected via a communication bus.

The central processing unit 44 is adapted to implement
a module 48 for obtaining from the first system 4, a modified maintenance processing algorithm 40 for a maintenance processing method Ti.
a module 50 for obtaining operational data comprising a first subset of encrypted data $(D1)_H$ and a second subset of non-encrypted data D2.
a module 52 for applying the modified maintenance processing algorithm 40, using this operational data as input.
a module 54 for transmitting to the first system 4 an encrypted maintenance information $(RES)_H$ thus obtained.
a module 56 for obtaining an end-of-maintenance-information signal.

The maintenance method according to the invention comprises an initialization phase and, specifically a maintenance phase.

Figure 2:
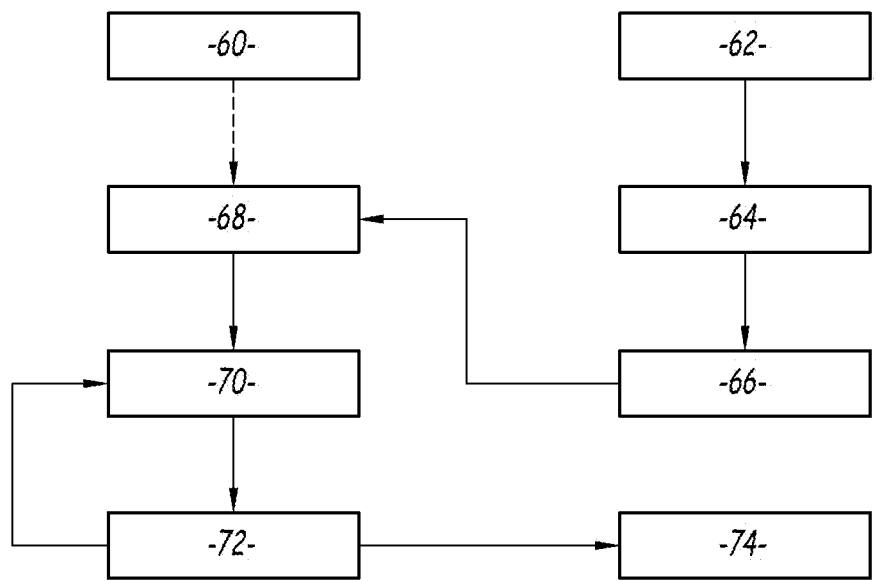
FIG. 2 is a flowchart of the main steps of an initialization phase of a maintenance process according to an embodiment of the invention.

FIG. 2 is a flowchart of the main steps of the initialization phase of a maintenance method according to one embodiment.

The method comprises steps performed by the first operational data protection system 4, and steps performed by the second maintenance system 8.

During a first step 60 of initialization of the maintenance process, the first system calculates and memorizes a pair of cryptographic keys, or bi-key, ($K_{pub}$, $K_{priv}$). The calculation is performed by a one-way trapdoor function. The key pair is stored in a memory unit 26 of the first system.

The second system implements a step 62 of obtaining an identifier of the device to be maintained and an address of its digital twin, and a step 64 of initializing maintenance processing(s).

The initialization 64 of the maintenance processing method includes obtaining a maintenance processing algorithm 38, for example in the form of computer code according to a programming language, or any other type of formal algorithm description, for example any logic or algebraic specification language such as Z, B or VDM (Vienna Development Method). A list of operational parameters whose values (operational data) are used to implement the maintenance processing algorithm 38 is stored.

In order to simplify the description, the initialization of a single maintenance processing method Ti is implemented here. Of course, the method applies for a plurality of distinct maintenance processing methods, and the steps of the maintenance method are then implemented for each of these maintenance processing methods.

Information relating to the maintenance processing method Ti is transmitted to the first system in a step 66. The information relating to the maintenance processing method Ti includes:
an identifier of the maintenance processing method,
the list of useful operational parameters (e.g. temperature, pressure, operating ranges, etc.)
the maintenance processing algorithm 38, in the form of a code or pseudo-code for example.

In a step 68 of receiving information related to the maintenance processing method, the first system receives this information and stores it.

The list of operational parameters received designates a set of operational data useful for the implementation of the maintenance processing method Ti.

Then the first system implements a partition 70 of the operational data set into two subsets: a first subset of confidential data, which will be encrypted, and a second subset of non-confidential data, which will be left plain. The partition is stored in association with the maintenance processing method identifier Ti.

The partitioning step 70 is followed by a step 72 of computing, by the cryptosystem, a modified maintenance processing algorithm 40 from the maintenance processing algorithm, depending on the partition of the operational data and at least one of the keys of the cryptosystem key pair. The modified maintenance processing algorithm complies with the relationship [Math 3] above.

The modified maintenance processing algorithm 40 is transmitted to the second system, which obtains and stores the modified maintenance processing algorithm 40 (step 74).

Optionally, upon request from the second system, the steps 70 of partitioning and 72 of computing a modified maintenance processing algorithm are iterated by the first system.

In this case, the second system sends, for example, a computational optimization request to the first system, and the first system iterates the partition and computation steps, for example by decreasing the cardinal Q of the first data subset.

Indeed, for a given homomorphic cryptosystem, the higher the cardinal Q of the first subset of data to be used in encrypted form, the higher the security is therefore, and the higher the complexity of the modified maintenance processing algorithm and the lower its computational efficiency. The partitioning of the data in the maintenance processing algorithm into confidential and non-confidential data thus achieves a trade-off between the security and computational efficiency of the modified maintenance processing algorithm.

Figure 3:
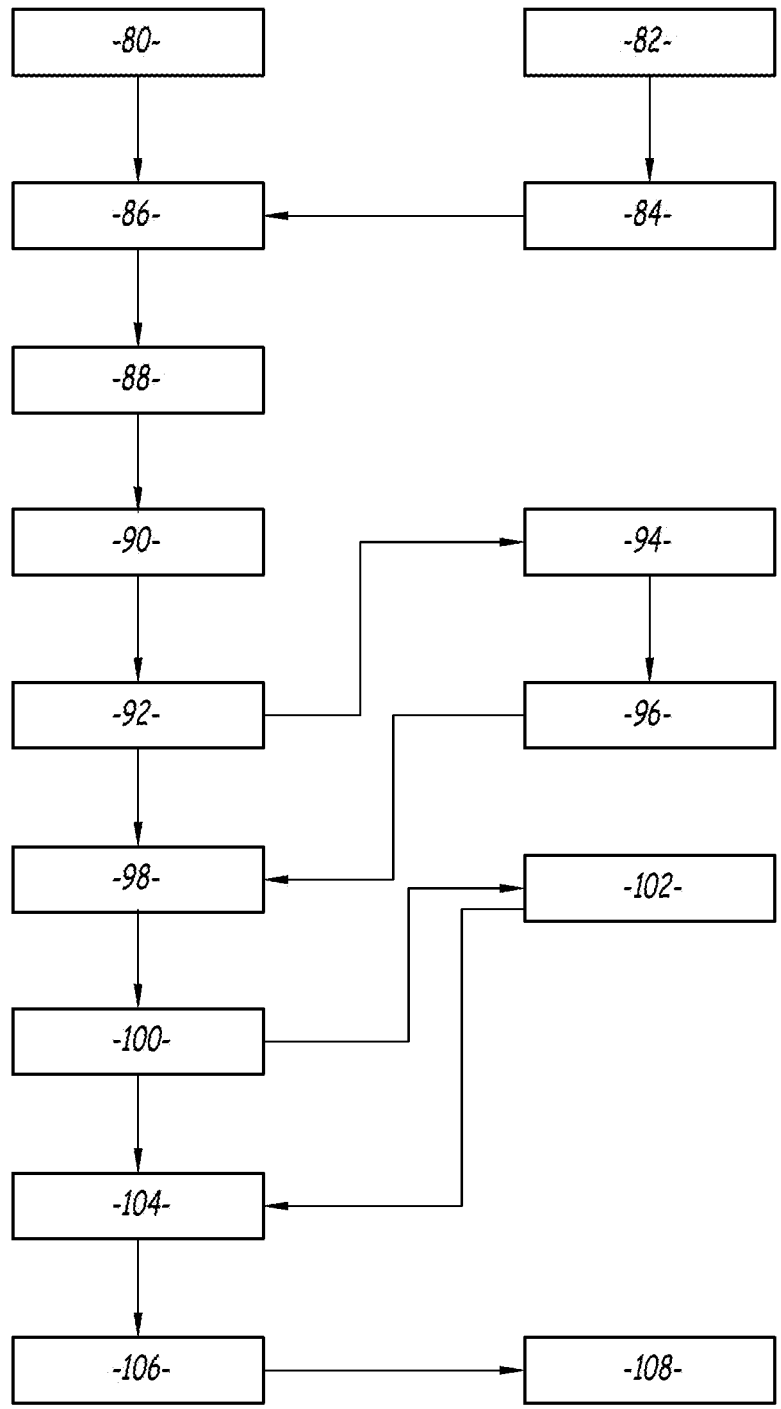
FIG. 3 is a flowchart of the main steps of a maintenance phase, specifically of a maintenance process according to an embodiment of the invention.

FIG. 3 is a flowchart of the main steps of a maintenance phase itself according to one embodiment.

The method comprises steps performed by the first operational data protection system 4, and steps performed by the second maintenance system 8.

Beforehand, the first system receives and stores (step 80) operational data relating to the operating system 6 when it is active. In one embodiment, step 80 is implemented in the background, and continues to be executed in parallel with the other steps described below.

The second system receives in a receiving step 82 a maintenance request from a device to be maintained. The maintenance request may be formed by a user, or by the second system following a predetermined event (for example, the elapse of a predetermined time after the previous maintenance operation), or by the first system, for example, by the digital twin of the device to be maintained.

In one embodiment, the maintenance request also includes an identifier of the maintenance processing method Ti to be applied.

Alternatively, the maintenance processing method to be applied is previously stored by the second system in connection with an identifier of the device to be maintained.

The step 82 is followed by a step 84 of transmission by the second system 8 of a request for obtaining operational data for the maintenance of the device to be maintained according to the maintenance processing method Ti, addressed to the first system.

During a reception step 86, the first system receives the request transmitted by the second system in step 84, extracts from it an identifier of the maintenance processing method Ti and implements an obtaining (86) of a set of operational data useful for performing the identified maintenance processing method.

The set of operational data is, for example, read from a memory unit of the first system. Alternatively, the first system obtains the operational data upon request from the operating system 6.

Next, the first system performs a separation 88 of the obtained operational data into a first subset of confidential data, and a second subset of non-confidential data, depending on information stored in the partition step 70.

Step 88 is followed by a step 90 of encrypting each of the operational data in the first subset, using the public key $K_{pub}$ of the stored key pair, and the homomorphic cryptosystem encryption function.

The protected operational data set, including the first subset of operational data in encrypted form and the second subset of operational data in plain form, is transmitted to the second system in a transmission step 92.

Following receipt of the protected operational data set, the second system (step 94) applies the previously received and stored modified maintenance processing algorithm 40 to this protected operational data set.

The result of the modified maintenance processing algorithm, which includes at least an item of predictive or corrective maintenance information in encrypted form, is sent to the first system in a step 96.

The result in encrypted form, received by the first system, is decrypted using the private key $K_{priv}$ and the decryption function of the homomorphic cryptosystem in step 98, and the resulting plain maintenance information is acknowledged by the first system in acknowledgement step 100.

The first system then transmits the resulting plain maintenance information to the operating system 6.

In a step 102, the operating system 6 implements the received maintenance information.

Here, more precisely, the system 6 in operation implements or not, on request of its operator or automatically, each of the instructions constituting the received maintenance information.

Then, upon request from the system 6 in operation, a step 104 of implementing the maintenance information as it was implemented by the system 6 in operation for the device 10 to be maintained in step 102, is implemented by the first system 4 for the digital twin 30.

More precisely, here, each of the instructions constituting the maintenance information is implemented or not implemented by the first system 4 for the digital twin 30, depending on whether or not it was implemented by the system 6 in operation for the device 10 to be maintained.

Step 104 is followed by a step 106 of transmitting, to the second system 8 by the first system 4, a maintenance information completion signal.

In response, the second system 8 closes the maintenance process in a step 108.

The above-described embodiments of the invention implement a homomorphic cryptosystem.

According to a variant, it is possible, provided that the maintenance process belongs to this subset, to use a partially homomorphic cryptosystem, i.e., homomorphic with respect to a subset of all the computable functions, e.g., expressible by using only addition or multiplication. In one embodiment, the RSA cryptosystem, homomorphic with respect to multiplication, is used.

Advantageously, thanks to the invention, the maintenance actor being able to perform his task without being able to decipher the confidential operational data (which only the first system 4, whose private key is required for this purpose, can do), does not have access to all of this operational data and consequently the operational data of the operator is protected. Any fraudulent exploitation of this data is prevented.

What is claimed is:

1. A computer-assisted maintenance method for a device within a system which comprises a first system, an operating system, and a second system,
    wherein the first system comprises a storage for operational data associated with the operating system, which are stored progressively when in use,
    wherein the operating system comprises the device to be maintained,
    wherein the said first and second systems being adapted to communicate with each other according to a communication protocol, and wherein the second system is configured to implement a maintenance process identified by a maintenance process identifier by applying a maintenance processing algorithm to a set of operational data to obtain at least one item of predictive or corrective maintenance information for the device to be maintained, the method comprising:

obtaining a modified maintenance processing algorithm computed by a homomorphic or partially homomorphic cryptosystem, to allow obtaining, without implementing a cryptographic operation, the said at least one predictive or corrective maintenance information in encrypted form, from a set of protected operational data comprising a first subset of data of the said set of encrypted operational data using a homomorphic or partially homomorphic cryptosystem encryption method, and a second subset of data in plain text of the said set of operational data, implementing the said modified maintenance processing algorithm on the second system from a first subset of encrypted operational data and a second subset of plain operational data obtained from the first system.

2. The method according to claim 1, further comprising, following implementation of the modified maintenance processing algorithm, a transmission of the said at least one predictive or corrective maintenance information in encrypted form to the first system.

3. The method according to claim 1, wherein the implementation of the modified maintenance processing algorithm, comprises the following steps implemented by the second system:

receiving a maintenance request from a device to be maintained, obtaining a maintenance processing identifier to be implemented, formulating a request for obtaining operational data from the operating system for the maintenance of the device to be maintained according to the identified maintenance process, and sending the said request to the first system, the said request comprising at least one identifier of the maintenance process to be applied.

4. The method according to claim 3, wherein implementing the modified maintenance processing algorithm comprises the following steps, implemented by the first system:

receiving a request to obtain operational data identifying a maintenance processing method from the second system, obtaining the set of operational data relating to the operating system useful for carrying out the identified maintenance processing method, separating the said set of operational data into a first subset of confidential data and a second subset of non-confidential data, encrypting, using the encryption module of the homomorphic or partially homomorphic cryptosystem, the data of the first data subset, transmitting the encrypted first data subset and the second plain data subset to the second system.

5. The method according to claim 1, comprising a prior step of obtaining and storing a pair of cryptographic keys by the said first system, to be used by the said cryptosystem to perform encryption and decryption.

6. The method according to claim 5 wherein obtaining a modified maintenance processing algorithm, implemented by the said first system, comprises:

a partitioning of the operational data set associated with the identified maintenance processing into a first subset of confidential data and a second subset of non-confidential data, computing the modified maintenance processing algorithm from the maintenance processing algorithm, based on the partition of the operational data and at least one key of the cryptographic key pair.

7. The method according to claim 6, wherein each of the said first and second data subsets has an associated cardinal, the method comprising, following a computational optimization request from the second system, an iteration by the first system of the partition and computation of the modified maintenance processing algorithm, comprising during the partition step a reduction of the cardinal of the first data subset.

8. The method according to claim 6, further comprising a transmission of the modified maintenance processing algorithm from the first system to the second system.

9. The method according to claim 1, wherein the first system is configured to maintain and store a digital twin of the device to be maintained.

10. A system which comprises a device to be maintained by a computer-assisted maintenance method, the system comprising:

a first system adapted to store operational data associated with the said operating system, progressively when in use, an operating system comprising the device to be maintained, and a second system adapted to implement a maintenance processing method, wherein the said first and second systems are adapted to communicate with each other according to a communication protocol, and for a maintenance processing method identified by a maintenance process identifier to be implemented by the second system by applying a maintenance processing algorithm to a set of operational data in order to obtain at least one item of predictive or corrective maintenance information of the said device to be maintained, modules configured to:

calculate, using a homomorphic or partially homomorphic cryptosystem, a modified maintenance processing algorithm to enable the said at least one predictive or corrective maintenance information to be obtained in encrypted form without implementing a cryptographic operation, from a protected operational data set comprising a first subset of data of the said operational data set encrypted by a homomorphic or partially homomorphic cryptosystem encryption module, and a second subset of plain data of the said operational data set implement the said modified maintenance processing algorithm on the second system from a first subset of encrypted operational data and a second subset of plain operational data obtained from the first system.

11. The system according to claim 10, wherein the first system comprises a module configured to perform:

a partitioning of the set of operational data associated with the identified maintenance processing method into a first subset of confidential data and a second subset of non-confidential data, computing the modified maintenance processing algorithm from the maintenance processing algorithm, based on the partition of the operational data and the cryptographic key pair.

12. The system according to claim 10, wherein the first system is configured to maintain and update a digital twin of the device to be maintained.

\* \* \* \* \*